United States Patent
Huang et al.

(10) Patent No.: US 9,691,423 B2
(45) Date of Patent: Jun. 27, 2017

(54) DEVICES INCLUDING AT LEAST ONE ADHESION LAYER AND METHODS OF FORMING ADHESION LAYERS

(71) Applicant: SEAGATE TECHNOLOGY LLC, Cupertino, CA (US)

(72) Inventors: Xiaoyue Huang, Eden Prairie, MN (US); Michael C. Kautzky, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 15 days.

(21) Appl. No.: 14/535,527

(22) Filed: Nov. 7, 2014

(65) Prior Publication Data
US 2015/0131418 A1    May 14, 2015

Related U.S. Application Data

(60) Provisional application No. 61/901,619, filed on Nov. 8, 2013.

(51) Int. Cl.
*G11B 5/31* (2006.01)
*G11B 5/60* (2006.01)
*G11B 5/00* (2006.01)

(52) U.S. Cl.
CPC ............ *G11B 5/6088* (2013.01); *G11B 5/314* (2013.01); *G11B 2005/0021* (2013.01)

(58) Field of Classification Search
None
See application file for complete search history.

(56) References Cited

U.S. PATENT DOCUMENTS

| 6,144,098 | A | 11/2000 | Iyer |
| 7,773,330 | B2 | 8/2010 | Itagi |
| 8,040,761 | B2 * | 10/2011 | Kawamori ............ G11B 5/3116 369/112.27 |
| 8,149,657 | B2 | 4/2012 | Huang |
| 8,248,897 | B2 | 8/2012 | Shimazawa |
| 8,339,740 | B2 | 12/2012 | Zou |
| 8,343,364 | B1 | 1/2013 | Gao |

(Continued)

FOREIGN PATENT DOCUMENTS

| EP | 0580368 | 1/1994 |
| JP | 2011-008899 | 1/2011 |

(Continued)

OTHER PUBLICATIONS

Hiroaki, Satoh et al., "Evaluation of Adhesion Materials for Gold Line-and-Space Surface Plasmon Antenna on SOI-MOS Photodiode", *Silicon Nanoelectronics Workshop (SNW)*, Jun. 13, 2010, pp. 1-2.

(Continued)

*Primary Examiner* — Kevin Bernatz
(74) *Attorney, Agent, or Firm* — Mueting, Raasch & Gebhardt, P.A.

(57) ABSTRACT

Devices that include a near field transducer (NFT), the NFT having at least one external surface; and at least one adhesion layer positioned on at least a portion of the at least one external surface, the adhesion layer including oxides of yttrium, oxides of scandium, oxides of lanthanoids, oxides of actionoids, oxides of zinc, or combinations thereof.

19 Claims, 7 Drawing Sheets

(56) References Cited

U.S. PATENT DOCUMENTS

| | | | |
|---|---|---|---|
| 8,351,151 B2 | 1/2013 | Katine | |
| 8,385,158 B1 | 2/2013 | Hu | |
| 8,400,902 B2 * | 3/2013 | Huang | G02B 6/102 369/112.27 |
| 8,427,925 B2 | 4/2013 | Zhao | |
| 8,599,656 B2 | 12/2013 | Jin | |
| 8,773,956 B1 | 7/2014 | Wang | |
| 8,787,129 B1 | 7/2014 | Jin | |
| 8,790,527 B1 | 7/2014 | Luo | |
| 8,830,800 B1 | 9/2014 | Pitcher | |
| 8,842,391 B2 | 9/2014 | Zou | |
| 8,934,198 B2 | 1/2015 | Zou | |
| 8,958,271 B1 | 2/2015 | Peng | |
| 8,971,161 B2 * | 3/2015 | Cheng | G11B 5/6088 369/13.33 |
| 8,976,634 B2 * | 3/2015 | Cheng | G11B 5/3106 369/13.13 |
| 9,058,824 B2 * | 6/2015 | Cheng | G11B 5/4866 |
| 9,129,620 B2 | 9/2015 | Cheng | |
| 9,263,074 B2 * | 2/2016 | Huang | G11B 5/314 |
| 9,281,003 B2 * | 3/2016 | Zhao | G11B 5/314 |
| 9,286,931 B2 * | 3/2016 | Jayashankar | G11B 5/314 |
| 2010/0104768 A1 | 4/2010 | Xiao | |
| 2010/0123965 A1 | 5/2010 | Lee | |
| 2010/0157745 A1 | 6/2010 | Okada | |
| 2010/0214685 A1 | 8/2010 | Seigler | |
| 2010/0321814 A1 | 12/2010 | Zou | |
| 2010/0329085 A1 | 12/2010 | Kawamori | |
| 2011/0002199 A1 | 1/2011 | Takayama | |
| 2011/0096431 A1 | 4/2011 | Hellwig | |
| 2011/0205863 A1 | 8/2011 | Zhao | |
| 2011/0205864 A1 | 8/2011 | Huang | |
| 2011/0209165 A1 | 8/2011 | Tsai | |
| 2012/0105996 A1 | 5/2012 | Katine | |
| 2012/0314549 A1 | 12/2012 | Lee | |
| 2013/0100783 A1 | 4/2013 | Ostrowski | |
| 2013/0107679 A1 | 5/2013 | Huang | |
| 2013/0148485 A1 | 6/2013 | Jin | |
| 2013/0170332 A1 | 7/2013 | Gao | |
| 2013/0235707 A1 | 9/2013 | Zhao | |
| 2013/0279314 A1 * | 10/2013 | Peng | G02B 6/0065 369/13.33 |
| 2013/0279315 A1 | 10/2013 | Zhao | |
| 2013/0288077 A1 | 10/2013 | Dhawan | |
| 2013/0330573 A1 | 12/2013 | Zhao | |
| 2014/0004384 A1 | 1/2014 | Zhao | |
| 2014/0251948 A1 | 9/2014 | Zhao | |
| 2014/0254335 A1 | 9/2014 | Gage | |
| 2014/0254336 A1 | 9/2014 | Jandric | |
| 2014/0307534 A1 | 10/2014 | Zhou | |
| 2014/0313872 A1 | 10/2014 | Rawat | |
| 2014/0374376 A1 | 12/2014 | Jayashankar | |
| 2014/0376342 A1 | 12/2014 | Wessel | |
| 2014/0376349 A1 | 12/2014 | Cheng | |
| 2015/0043319 A1 | 2/2015 | Kasuya | |
| 2015/0063086 A1 | 3/2015 | Wierman | |
| 2015/0117170 A1 * | 4/2015 | Zhao | G11B 5/314 369/13.33 |
| 2015/0131418 A1 | 5/2015 | Huang | |
| 2015/0179194 A1 | 6/2015 | Cheng | |
| 2015/0340052 A1 * | 11/2015 | Sankar | G11B 5/6088 369/13.33 |
| 2015/0380020 A1 * | 12/2015 | Cheng | G11B 5/6088 369/13.33 |
| 2016/0133291 A1 | 5/2016 | Chen | |
| 2016/0260448 A1 * | 9/2016 | Zhao | G11B 5/314 |
| 2016/0284365 A1 | 9/2016 | Brons | |

FOREIGN PATENT DOCUMENTS

| | | |
|---|---|---|
| JP | 2013-122811 | 6/2013 |
| WO | WO 2013/163195 | 10/2013 |
| WO | WO 2013/163470 | 10/2013 |

OTHER PUBLICATIONS

Vogt, K.W. et al., "Characterization of Thin Titanium Oxide Adhesion Layers on Gold: Resistivity, Morphology, and Composition", *Surface Science*, vol. 301, No. 1-3, Jan. 10, 1994, pp. 203-213.

Metallization: "Metallization"; "Chapter 5", In: Kris V. Srikrishnan and Geraldine C. Schwartz: "Handbook of Semiconductor Interconnection Technology, Second Edition", 2006, pp. 311-382.

PCT International Search Report and Written Opinion for PCT/US2016/034628 dated Aug. 24, 2016 (14 pages).

PCT International Search Report and Written Opinion for PCT/US2016/034620 dated Aug. 18, 2016 (13 pages).

* cited by examiner

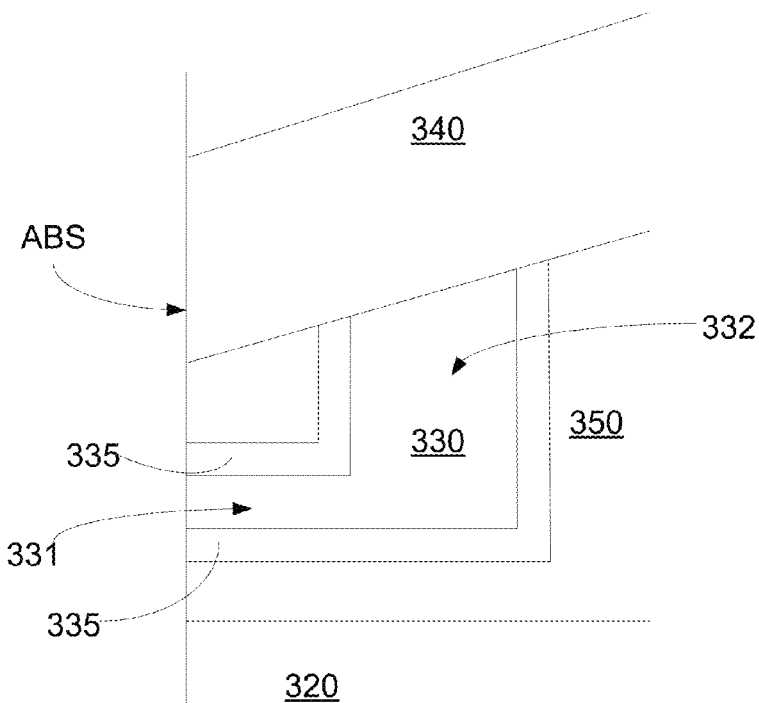
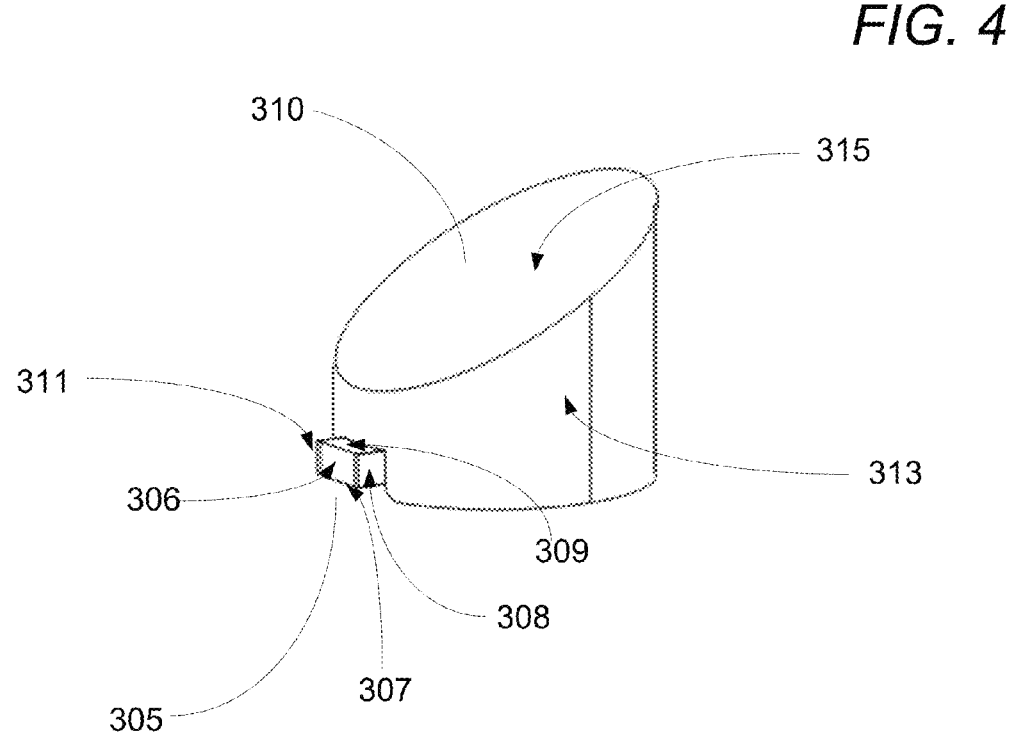

US 9,691,423 B2

DEVICES INCLUDING AT LEAST ONE ADHESION LAYER AND METHODS OF FORMING ADHESION LAYERS

CROSS REFERENCE TO RELATED APPLICATION

This application claims priority to U.S. Provisional Applications No. 61/901,619, entitled DEVICES INCLUDING NEAR FIELD TRANSDUCERS AND ASSOCIATED DIELECTRIC LINER, filed on Nov. 8, 2013, the disclosure of which is incorporated herein by reference thereto.

SUMMARY

Disclosed are devices that include a near field transducer (NFT), the NFT having at least one external surface; and at least one adhesion layer positioned on at least a portion of the at least one external surface, the adhesion layer including oxides of yttrium, oxides of scandium, oxides of lanthanoids, oxides of actionoids, oxides of zinc, or combinations thereof.

Also disclosed are devices that include a near field transducer (NFT), the NFT having a disc and a peg, wherein the peg has five surfaces thereof and the disc has an upper surface and a side surface; and at least one adhesion layer positioned on at least one surface of the peg or the disc, the adhesion layer including oxides of yttrium, oxides of scandium, oxides of lanthanoids, oxides of actionoids, oxides of zinc, or combinations thereof.

Also disclosed are devices that include an energy source; a near field transducer (NFT) configured to receive energy from the energy source, the NFT having at least one external surface; and at least one adhesion layer positioned on at least a portion of the at least one external surface, the adhesion layer including oxides of yttrium, oxides of scandium, oxides of lanthanoids, oxides of actionoids, oxides of zinc, or combinations thereof.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

FIG. 3 is a cross sectional view of a portion of a disclosed device.

FIG. 4 is a perspective view of a particular type of NFT.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (referred to through as HAMR) utilizes radiation, for example from a laser, to heat media to a temperature above its curie temperature, enabling magnetic recording. In order to deliver the radiation, e.g., a laser beam, to a small area (on the order of 20 to 50 nm for example) of the medium, a NFT is utilized. During a magnetic recording operation, the NFT absorbs energy from a laser and focuses it to a very small area; this can cause the temperature of the NFT to increase. The temperature of the NFT can be elevated up to about 400° C. or more.

In some embodiments, a NFT can include a small peg and a large disk. The very high temperatures that the NFT reaches during operation can lead to diffusion of the material of the NFT (for example gold) from the peg and towards the disk. This can lead to deformation and recession of the peg, which can lead to failure of the NFT and the entire head.

Disclosed devices include one or more layers adjacent one or more surfaces of the peg of the NFT to increase or improve adhesion of the peg material to the surrounding materials or structures within the device. If the peg is better adhered to the surrounding materials or structures, it will be less likely to deform and/or recess.

Figure 1:
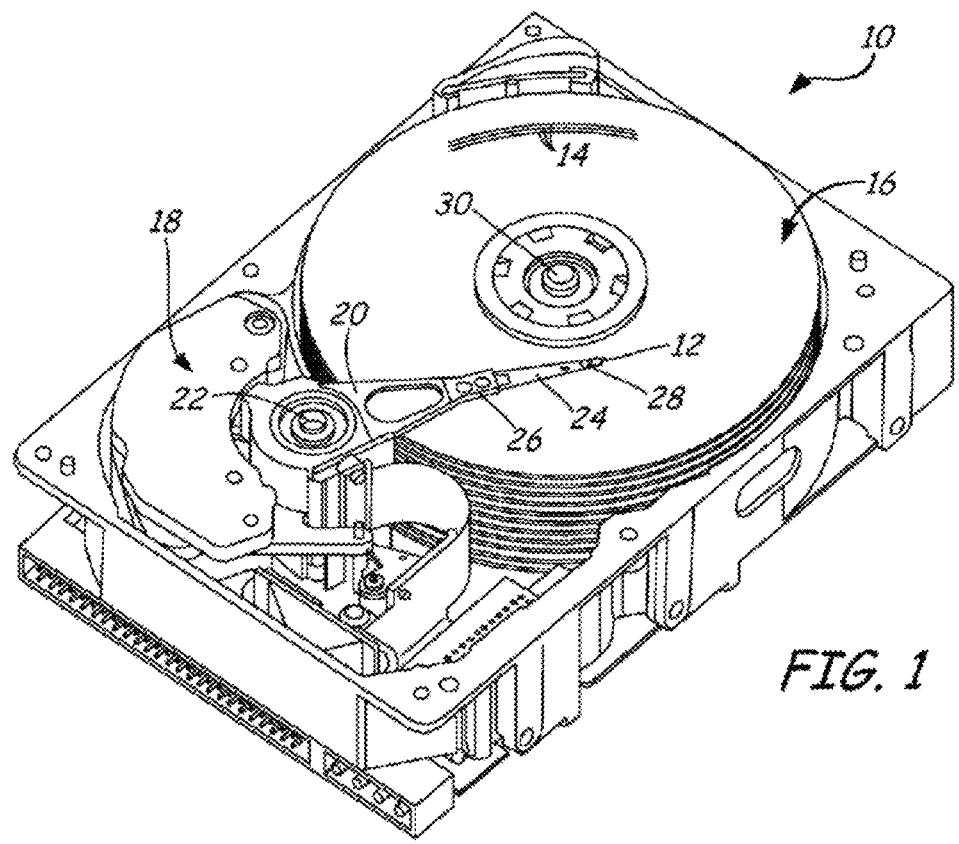
FIG. 1 is a perspective view of a magnetic disc drive that can include HAMR devices.

FIG. 1 is a perspective view of disc drive 10 including an actuation system for positioning slider 12 over track 14 of magnetic medium 16. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

Figure 2:
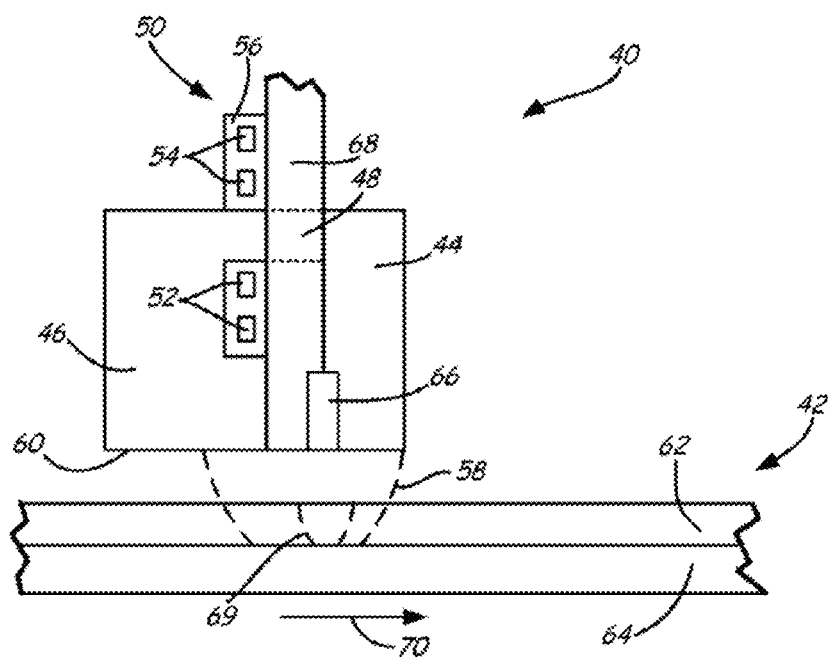
FIG. 2 is a cross sectional view of a perpendicular HAMR magnetic recording head and of an associated recording medium.

A HAMR transducer includes a magnetic writer for generating a magnetic field to write to a magnetic medium (e.g. magnetic medium 16) and an optical device to heat a portion of the magnetic medium proximate to the write field. FIG. 2 is a cross sectional view of a portion of a magnetic device, for example a HAMR magnetic device 40 and a portion of associated magnetic storage medium 42. HAMR magnetic device 40 includes write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising magnetically hard storage layer 62 and soft magnetic underlayer 64 but can be other forms of media, such as patterned media. A current in the coil induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer 66 is positioned adjacent the write pole 44 proximate air bearing surface 60. Near field transducer 66 is coupled to waveguide 68 that receives an electromagnetic wave from an energy source such as a laser. An electric field at the end of near field transducer 66 is used to heat a portion 69 of magnetically hard layer 62 to lower the coercivity so that the magnetic field from the write pole can affect the magnetization of the storage medium.

Devices disclosed herein can also include other structures. Devices disclosed herein can be incorporated into larger devices. For example, sliders can include devices as disclosed herein. Exemplary sliders can include a slider body that has a leading edge, a trailing edge, and an air bearing surface. The write pole, read pole, optical near field transducer and contact pad (and optional heat sink) can then be located on (or in) the slider body. Such exemplary sliders can be attached to a suspension which can be incorporated into a disc drive for example. It should also be noted that disclosed devices can be utilized in systems other than disc drives such as that depicted in FIG. 1.

FIG. 3 shows a cross section of a device taken perpendicular to the air bearing surface (ABS). The device includes a write pole 340, a waveguide core 320, optical cladding 350 and a NFT 330. Between the NFT 330 and the optical cladding 350 is an adhesion layer 335. The embodiment depicted in FIG. 3 shows the adhesion layer 335 located around portions of the peg 331 and the disc 332. In some embodiments, the adhesion layer 335 can be located on different surfaces of the NFT 330.

FIG. 4 shows an example of a peg and disc of a peg and disc type NFT. The NFT in FIG. 4 includes a peg 305 and a disc 310. The peg 305 includes five surfaces that are not in contact with the disc 310, an air bearing surface 306, a first surface 307, a second surface 309, a third surface 308, and a fourth surface 311. The disc 310 includes a top surface 315 and a side surface 313. Because the exemplary disc 310 is circular, the side surface 313 is depicted as a single continuous surface, but it should be understood that this need not be the case.

In some embodiments, the second surface 309 and the first surface 307 are facing the pole and core respectively. In some embodiments, the third surface 308 and the fourth surface 311 are not facing the pole or the core. More specifically, the third surface 308 would be located in front of the paper on which FIG. 2 is depicted and the fourth surface 311 would be located behind the paper on which FIG. 2 is depicted. In some embodiments, the second surface 309 can also be referred to as the NFT-pole surface which faces a NFT-pole space, which can be referred to as a NPS (not shown herein). In some embodiments, the first surface 307 can also be referred to as the NFT-core surface, which faces a NFT-core space, which can be referred to as CNS (not shown herein). In some embodiments, the third surface 308 can also be described as the surface which faces the left side of a device, in some embodiments; a left solid immersion mirror can be located there. In some embodiments, the fourth surface 311 can also be described as the surface which faces the right side of a device, in some embodiments; a right solid immersion mirror can be located there.

Disclosed devices can include one or more adhesion layers located on one or more surfaces of a NFT. In some embodiments, disclosed devices can include one or more adhesion layers located on one or more surfaces of a peg of a NFT. In some embodiments, disclosed devices can include one or more adhesion layers located on one or more surfaces of a disc of a NFT. In some embodiments, disclosed devices can include adhesion layers located on two or more surfaces of a peg of a NFT. In some embodiments, disclosed devices can include adhesion layers located on three or more surfaces of a peg of a NFT. In some embodiments, disclosed devices can include adhesion layers located on four or more surfaces of a peg of a NFT. In some embodiments, disclosed devices can include adhesion layers located on all five surfaces of a peg of a NFT. In some embodiments disclosed devices can include adhesion layers located on each of the first surface 307, the second surface 309, the third surface 308, and the fourth surface 311. In some embodiments, disclosed devices can include adhesion layers located on the air bearing surface 306, the first surface 307, the second surface 309, the third surface 308, and the fourth surface 311 of the peg 306, and the side surface 313 and the top surface 315 of the disc 310. In some embodiments, adhesion layers on different surfaces of the peg could have different materials. In some embodiments, the adhesion layer on one or more surfaces could be different in order to reduce the optical penalty.

Figure 5:
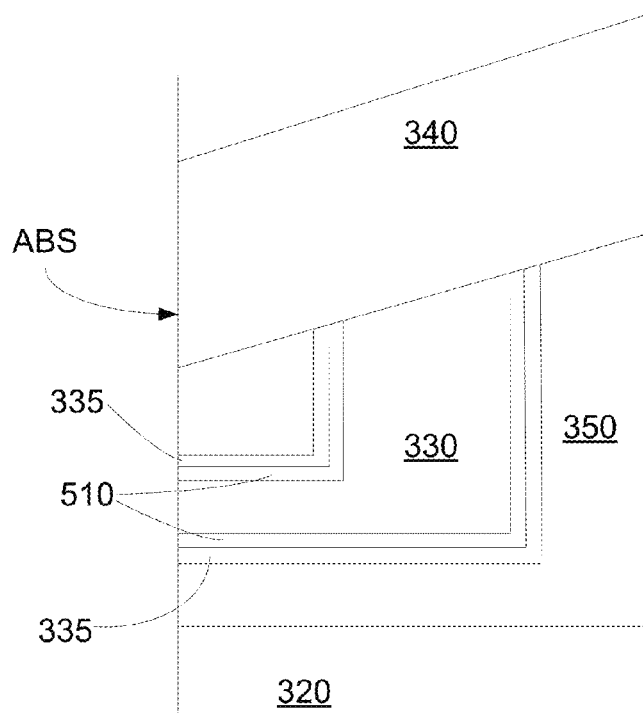
FIG. 5 is a cross sectional view of a portion of a disclosed device that includes an optional seed layer.

In some embodiments, an optional seed layer can also be included in disclosed devices. In such embodiments, the optional seed layer can be positioned between the NFT material and the adhesion layer. FIG. 5 demonstrates the cross section seen in FIG. 3 with such an optional seed layer 510. The optional seed layer can be made of typically utilized seed layer materials. Examples of such materials can include zirconium (Zr), tantalum (Ta), nickel (Ni), titanium (Ti), and chromium (Cu). The optional seed layer can have thicknesses as low as 1 Å, as low as 2 Å, or as low as 4 Å. The optional seed layer can have thicknesses as high as 10 Å, as high as 8 Å, or as high as 6 Å. In some embodiments, the optional seed layer can have a thickness of 5 Å, for example.

The material of the adhesion layer can be selected based, at least in part, on properties of the materials that surround the adhesion layer. For example, the material of the adhesion layer can be selected based, at least in part, on properties of the material of the NFT, for example the peg. In some embodiments, the NFT can be made of gold (Au) or gold containing materials for example. At operating temperatures (relatively high, for example 400° C. or higher) gold (for example) can de-bond from surrounding surfaces (for example the CNS, or the NPS) due to low adhesion strengths between the gold and surrounding materials. Disclosed adhesion layers may serve to improve adherence between the NFT and the surrounding layers. Therefore, one such property that can be considered when choosing material(s) for the adhesion layer is the adhesion of the material(s) to the NFT material, e.g., Au or an Au alloy. Another property that can be important is whether the material(s) can contribute to the stability of the NFT material, e.g., Au or an Au alloy. Another property that can be important can be the optical performance (e.g., optical loss and/or plasmonic penalty) of the material(s) of the adhesion layer. Yet another property that can be important is the robustness of the material(s), as materials that are more robust should have less deformation or degradation in performance, and should be stable to the highly oxidative and high humidity conditions seen in HAMR.

One property that can be considered when determining whether a particular material should be chosen for an adhesion layer(s) is the interface energy of the material and the material that will be surrounding it in the device. Interface energy can be difficult to measure, but wettability can offer insight into the interface energy of two materials. The more wetting one material has on another, the higher the interface energy between the two is likely to be. Stated another way, a relatively high wettability of a first material to a second material may allow for more two dimensional growth in the plane during the initial stages of material growth of the first material so that a film of the first material may be relatively more smooth with a relatively lower roughness, when compared to the first material grown on a material that does not have as high a wettability for the first material. In some embodiments, the orientation of crystals grown on a material can also be considered in order to determine if a material is to be used for an adhesion layer(s).

Figure 6:
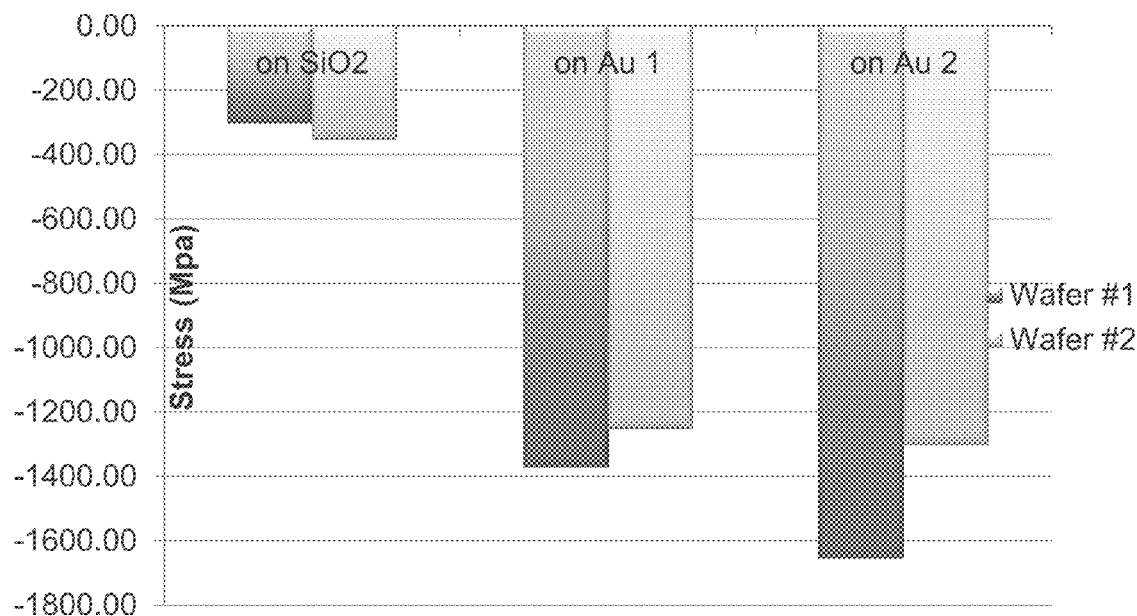
FIG. 6 shows the stress difference of $Y_2O_3$ on $SiO_2$ and Au.
Figures 7A, 7B, 7C, 7D:
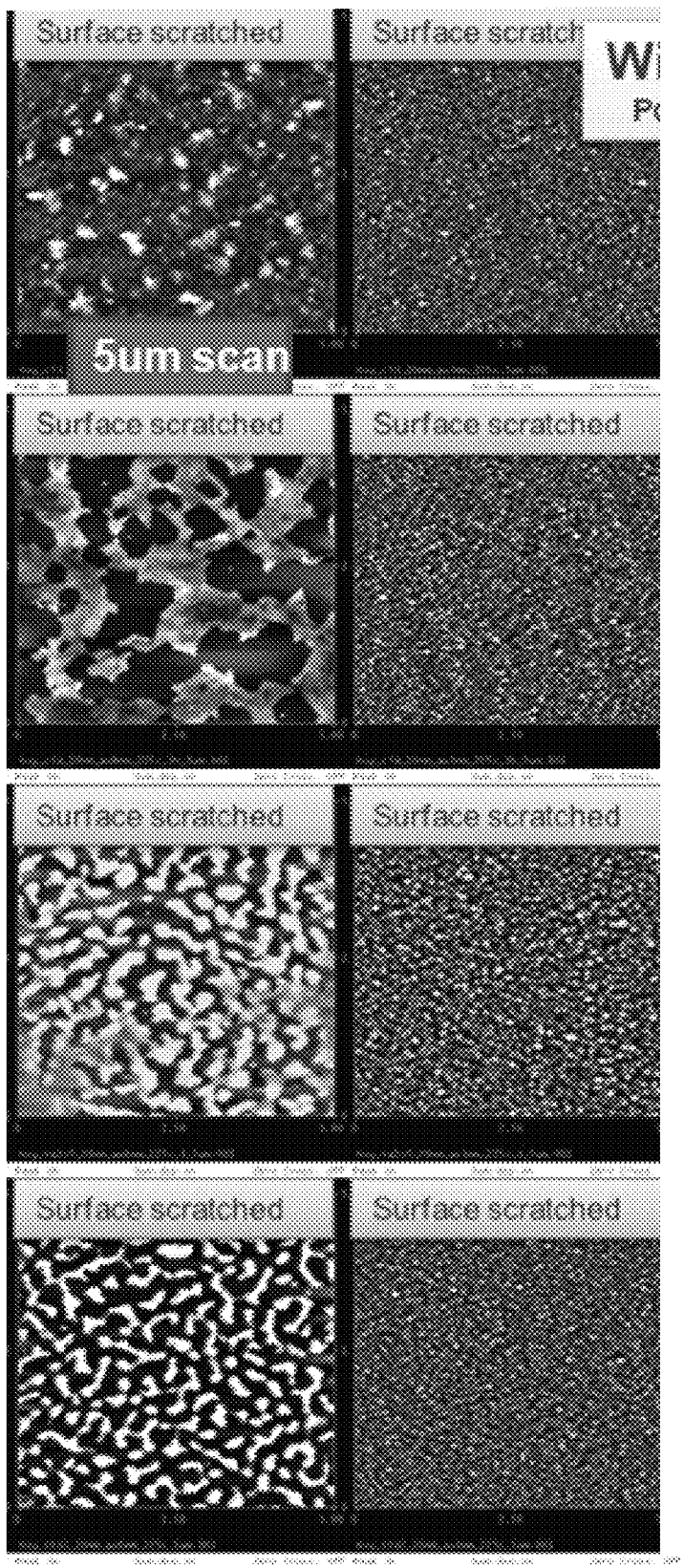
FIGS. 7A, 7B, 7C, 7D, 7E, 7F, 7G, and 7H show scanning electron microscope (SEM) images of 6 nm Au (left image) and 3 nm Au (right image) laminates with a $TaSi_2O_x$ (FIG. 7A), $SiO_xN_y$ (FIG. 7B), $Ta_2O_5$ (FIG. 7C), $TiO_2$ (FIG. 7D), $Al_2O_3$ (FIG. 7E), $SiO_2$ (FIG. 7F), $Y_2O_3$ (FIG. 7G), and MgO (FIG. 7H) underlying materials.
Figures 7E, 7F, 7G, 7H:
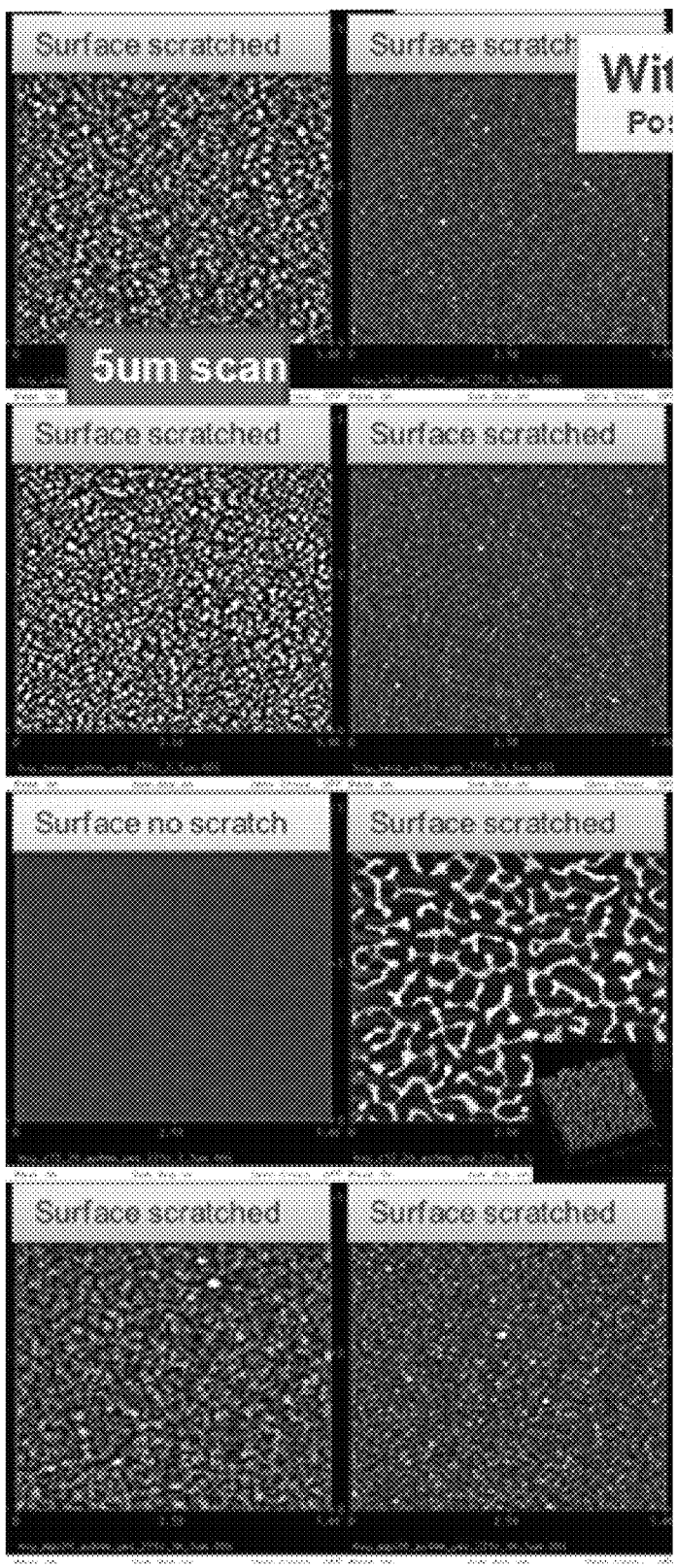

Tensile stress and compressive stress of materials of the adhesion layer may also be relevant properties to consider. The material upon which another material is grown can affect the stresses within the material that is being grown (or deposited). FIG. 6 shows a graph of the stress difference of a yttrium oxide ($Y_2O_3$) layer grown on both amorphous $SiO_2$ and Au (duplicated). As seen from FIG. 6 the yttrium oxide ($Y_2O_3$) layer grown on gold has higher compressive stress than that grown on $SiO_2$. The compressive stress present in the yttrium oxide ($Y_2O_3$) layer grown on gold (for example) can offer additional forces to constrain a gold (Au) peg to prevent or minimize the deformation thereof during use.

In some embodiments, adhesion layer(s) (located on one or more surfaces of a NFT, for example a peg of a NFT) can include oxides of yttrium, oxides of scandium, oxides of lanthanoids (or lanthanides), oxides of actionoids (or actinides), oxides of zinc, or combinations thereof. More specifically, the adhesion layer(s) may include yttrium oxide ($Y_2O_3$), scandium oxide ($Sc_2O_3$), oxides of lanthanoids: lanthanum oxide ($La_2O_3$), cerium oxide ($Ce_2O_3$, or $CeO_2$), praseodymium oxide ($Pr_2O_3$), neodymium oxide ($Nd_2O_3$), promethium oxide ($Pm_2O_3$), samarium oxide ($Sm_2O_3$), europium oxide ($Eu_2O_3$), gadolinium oxide ($Gd_2O_3$), terbium oxide ($Tb_4O_7$, $Tb_2O_3$, $TbO_2$, or $Tb_6O_{11}$), dysprosium oxide ($Dy_2O_3$), holmium oxide ($Ho_2O_3$), erbium oxide ($Er_2O_3$), thulium oxide ($Tm_2O_3$), ytterbium oxide ($Yb_2O_3$), and lutetium oxide ($Lu_2O_3$), oxides of actinoids: actinium oxide ($Ac_2O_3$), thorium oxide ($Th_2O_7$ or $THO_2$), protactinium oxide ($Pa_2O_5$, $PaO_2$, or $PaO$), uranium oxide ($U_3O_8$, $UO_2$, $UO_3$, $U_2O_5$, or $UO_4.2H_2O$), neptunium oxide ($NpO_2$, $Np_2O_5$, or $Np_5O_8$), plutonium oxide ($PuO_2$ or $PuO_4$), americium oxide (AmO, $Am_2O_3$, or $AmO_2$), curium oxide ($Cm_2O_3$, $CmO_2$, or $CmO_4$), berkelium oxide ($Bk_2O_3$, or $BkO_2$), californium oxide ($Cf_2O_3$ or $CfO_2$), einsteinium oxide ($Es_2O_3$), fermium oxide ($Fm_2O_3$, or FmO), mendelevium oxide ($Md_2O_3$ or MdO), nobelium oxide ($No_2O_3$ or NoO), and lawrencium oxide ($Lr_2O_3$), zinc oxide (ZnO), or combinations thereof. In some embodiments, adhesion layer(s) may include yttrium oxide or scandium oxide. In some embodiments, adhesion layer(s) may include yttrium oxide.

In some embodiments, yttrium oxide, scandium oxide, or combinations thereof can be utilized with a NFT made of Au or an Au alloy. In some embodiments, an adhesion layer(s) including yttrium oxide can be utilized with a NFT made of an AuY alloy. In some embodiments, an adhesion layer(s) including scandium oxide can be utilized with a NFT made of an AuSc alloy. In some embodiments, zinc oxide can be utilized with a NFT made of Ag or an Ag alloy.

Disclosed adhesion layers can have various thicknesses. The thickness of an adhesion layer can refer to the average thickness of the adhesion layer. In some embodiments, a disclosed adhesion layer can have a thickness that is at least 1 nm, in some embodiments at least 2 nm, or in some embodiments at least 4 nm. In some embodiments, a disclosed adhesion layer can have a thickness that is not greater than 10 nm, in some embodiments not greater than 8 nm, or in some embodiments, not greater than 6 nm. Thicknesses that are sufficiently greater than 10 nm, can for example lead to an index of refraction of the adhesion layer that is relatively too high and can detract from the optical properties of the device. The thickness (e.g., the average thickness) of an adhesion layer can be measured using, for example, transmission electron microscopy (TEM), X-ray reflectivity (XRR), or x-ray photoelectron spectroscopy (XPS). The thickness can be determined using calibration from standard samples having known thicknesses, for example.

One of skill in the art, having read this specification will understand that NFT types other than peg and disk (also referred to as "lollipop" type NFTs) could be utilized herein. For example plasmonic gap type NFTs and peg only NFTs can also be utilized. In some embodiments, various materials including, for example, gold (Au), silver (Ag), copper (Cu), alloys thereof, or other materials can be utilized to form a NFT. In some embodiments, the NFT can also be made of materials listed in U.S. Patent Publication No. 2013/0286799, U.S. Pat. No. 8,427,925, and U.S. patent application Ser. No. 13/923,925 entitled MAGNETIC DEVICES INCLUDING FILM STRUCTURES, filed on Jun. 21, 2013, and Ser. No. 14/062,651 entitled RECORDING HEADS INCLUDING NFT AND HEATSINK, filed on Oct. 24, 2013, the disclosures of which are incorporated herein by reference thereto.

In some embodiments, materials that can be utilized for adhesion layers can be those that provide acceptable levels of NFT coupling efficiency loss. Such materials can generally have relatively high indices of refraction (n). The presence of a non-plasmonic material layer, e.g., a disclosed adhesion layer in some embodiments, at the interface of the NFT material and the cladding material layer can "dampen" the ability of that interface to support surface plasmons, which can result in weaker electric field emission from the NFT. Such materials may also have relatively favorable k values. In some embodiments, materials that are more highly detrimental from an optical standpoint can be utilized at relatively smaller thicknesses, for example.

Methods of making devices including disclosed adhesion layers can vary depending on the location of the adhesion layer. In embodiments where one or more adhesion layers are being utilized on the first surface 307, the third surface 308, the fourth surface 311, or any combination thereof, the adhesion layer(s) can be deposited, then the NFT material can be deposited, followed by the cladding or dielectric material. The adhesion layer(s) then affects adhesion between the underlying dielectric material (for example the cladding layers or dielectric layers) and the NFT. In embodiments where an adhesion layer is utilized on the second surface 309, the adhesion layer material can be deposited on the NFT material after it is deposited, for example in a trench (either lined with a disclosed adhesion layer material or not). The adhesion layer on the second surface 309 then affects adhesion between the NFT material and the overlying dielectric material (for example the top cladding layer). In some embodiments, an adhesion layer material can be deposited on a NFT material layer. This structure can then be trimmed in order to form a peg (from the NFT material layer) with an adhesion layer on the first surface 307 of the peg. Next, an adhesion layer can be formed on the third surface 308, the fourth surface 311 and the second surface 309. Excess adhesion layer material can then optionally be removed from the structure.

Illustrative processes for forming disclosed adhesion layers can include for example, deposition methods such as chemical vapor deposition (CVD) such as plasma enhanced chemical vapor deposition (PECVD), physical vapor deposition (PVD), atomic layer deposition (ALD) such as plasma enhanced atomic layer deposition (PEALD), solution methods such as plating (e.g., electroplating), sputtering methods, cathodic arc deposition methods, ion implantation method and evaporative methods. In some embodiments, methods including forming disclosed adhesion layers can also include processes in which the adhesion layer and the layer to be formed thereon on formed in situ. In some embodiments, methods including forming disclosed adhesion layer can also include processes in which the adhesion layer is treated, e.g., cleaned, before another layer is formed therein (such steps can be referred to as a pre-clean step). In some embodiments, methods including forming disclosed adhesion layers can also include processes in which the adhesion layer and the layer to be formed thereon on formed in situ and the adhesion layer is pre-cleaned before another layer is formed thereon.

Processes to form the adhesion layer could be easily integrated into the overall manufacturing process of the device. Overall, the use of disclosed adhesion layers would decrease or eliminate yield loss due to delamination of the NFT and contribute to increased NFT lifetime during the operation of the magnetic device with very little effect on current formation processes for the device.

The present disclosure is illustrated by the following examples. It is to be understood that the particular examples, assumptions, modeling, and procedures are to be interpreted broadly in accordance with the scope and spirit of the disclosure as set forth herein.

EXAMPLES

Figure 8A:
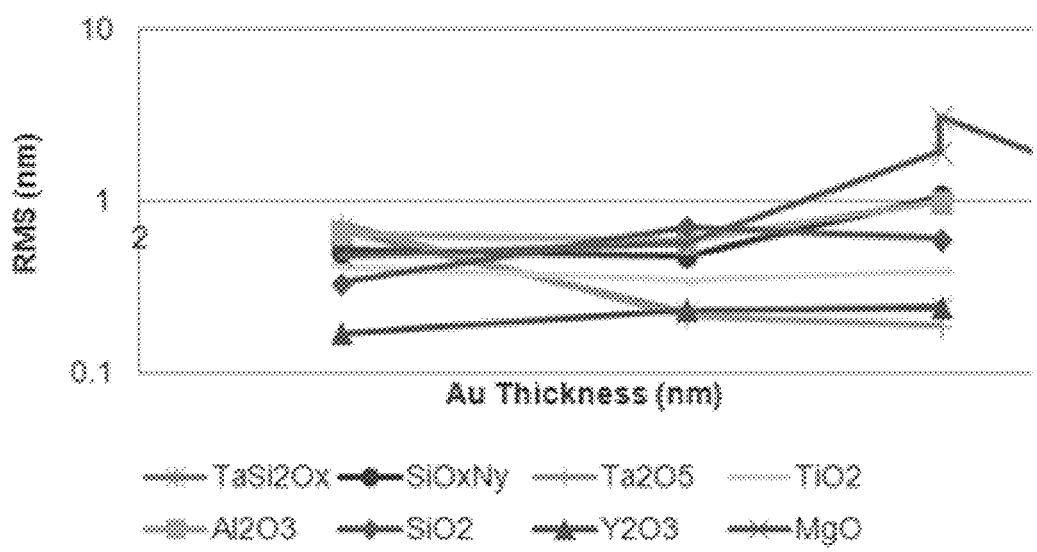
FIGS. 8A and 8B show surface roughness (RMS) before the anneal (FIG. 8A) and after the anneal (FIG. 8B) for the laminates seen in FIG. 7.
Figure 8B:
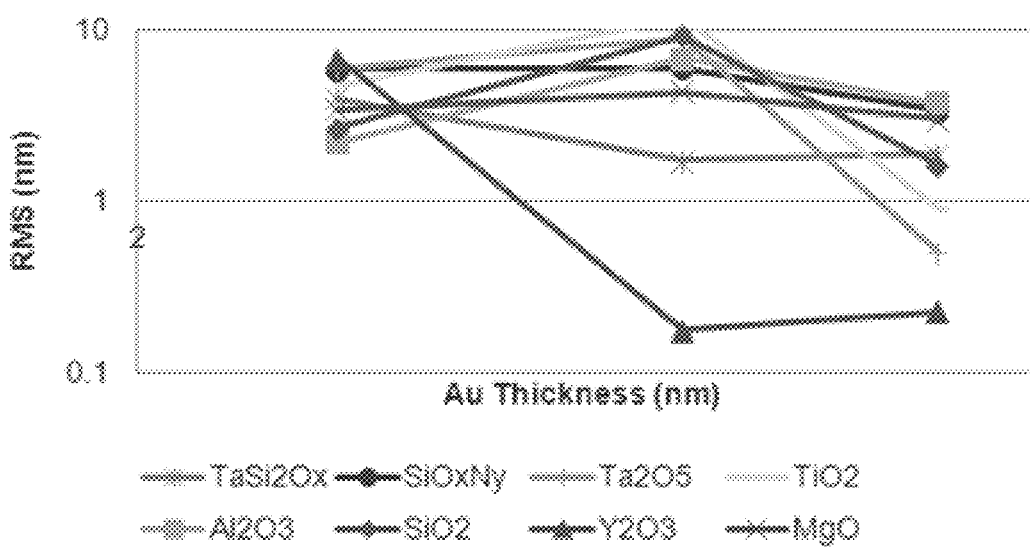
Figure 9A:
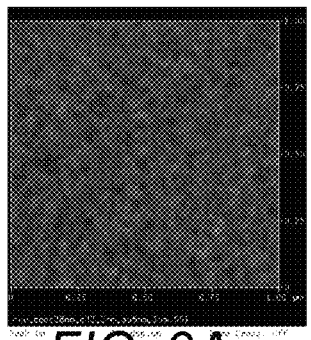
FIGS. 9A, 9B, 9C, 9D, 9E, and 9F are scanning electron microscope (SEM) images of Au layers formed on underlying Y2O3.
Figure 9C:
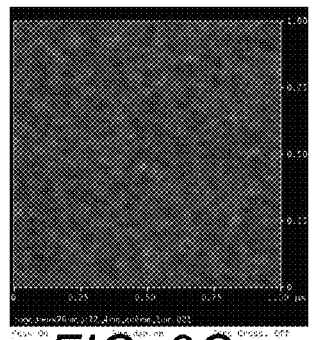
Figure 9E:
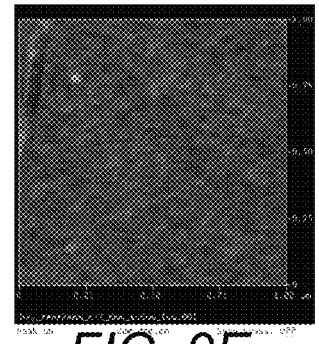
Figure 9B:
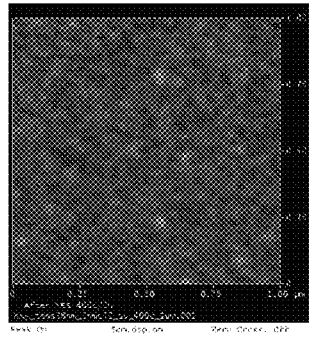
Figure 9D:
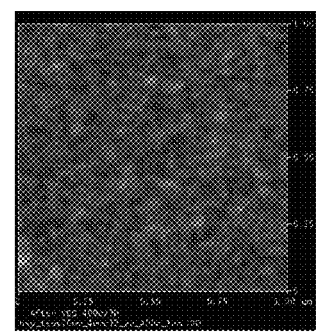
Figure 9F:
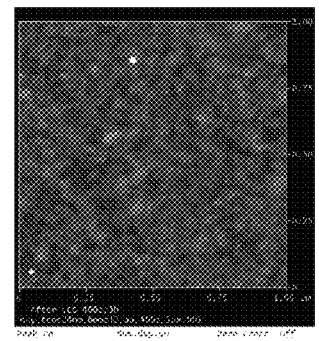

A number of different dielectric materials were deposited and then gold (Au) layers having thicknesses of 6 nm and 3 nm were deposited thereon. The laminate was then annealed at 225° C. for 3 hours. The dielectric materials were $TaSi_2O_x$, $SiO_xN_y$, $Ta_2O_5$, $TiO_2$, $Al_2O_3$, $SiO_2$, $Y_2O_3$, and MgO. FIGS. 7A, 7B, 7C, 7D, 7E, 7F, 7G, and 7H show the 6 nm (left image) and 3 nm (right image) laminates with the $TaSi_2O_x$, $SiO_xN_y$, $Ta_2O_5$, $TiO_2$, $Al_2O_3$, $SiO_2$, $Y_2O_3$, and MgO underlying materials respectively. As seen from these atomic force microscope (AFM) images, only the laminate with $Y_2O_3$ underlying the 6 nm Au resisted needle type surface scratches as well as exhibited film integrity without nucleation or percolation. FIGS. 8A and 8B show the surface roughness (RMS) before the anneal (FIG. 8A) and after the anneal (FIG. 8B). As seen from these graphs, only the laminate with the $Y_2O_3$ underlying had an acceptable level of Au roughness after the anneal, which implies that the 6 nm thin Au film had not broken into islands, thereby creating undesirably high roughness.

Figure 10:
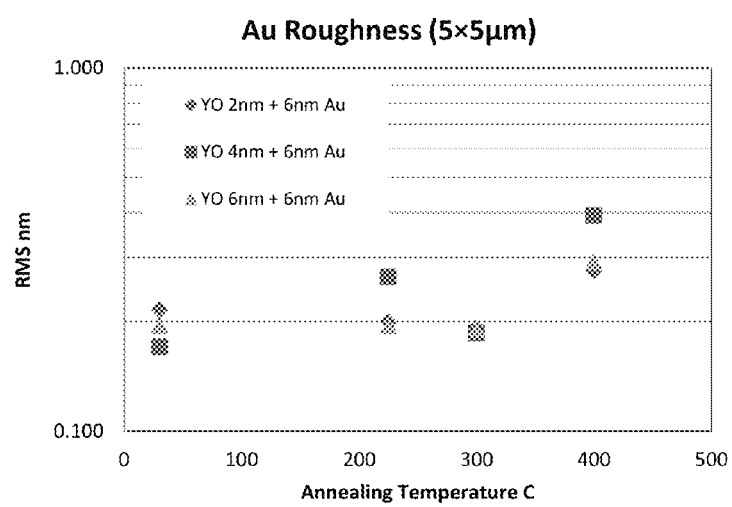
FIG. 10 shows a graph of the surface roughness (RMS nm) of the Au versus the annealing temperature for the 6 nm, 4 nm, and 2 nm underlying $Y_2O_3$.

A 6 nm, 4 nm, and 2 nm adhesion layer of $Y_2O_3$ was sputtered or atomic layer deposited (ALD) onto an $SiO_2$ substrate. A 6 nm Au layer was then grown on the $Y_2O_3$ layer via sputter deposition or ALD. Atomic force microscope (AFM) images were taken before and after annealing at 400° C. The images are seen in FIGS. 9A, 9B, 9C, 9D, 9E, and 9F. FIG. 10 shows a graph of the surface roughness (RMS nm) of the Au versus the annealing temperature for the 6 nm, 4 nm, and 2 nm $Y_2O_3$ underlying. As seen by looking at FIGS. 9 and 10, it can be seen that all of the samples exhibited strong adhesion, passing the scribe/tape test after annealing. It can also be seen that the 6 nm gold film is still covering the surface well with relatively minimal increases in roughness, which could be due to Au grain grown during annealing.

It was also shown that the electrical resistivity of gold grown on yttrium oxide is lower than when grown on alumina. Testing showed that Au electric resistivity was about 12% lower when grown on $Y_2O_3$ than when grown on $Al_2O_3$. Such a change leads to approximately 12% higher thermal conductivity in the case of the Au grown on the $Y_2O_3$.

It was also shown that a process that includes in situ formation of the adhesion layer ($Y_2O_3$) and the overlying material (Au) can be advantageous. It was also shown that a process that includes pre-cleaning the adhesion layer ($Y_2O_3$) before deposition of the gold (Au) can be advantageous because it prevents or minimizes formation of yttrium carbonate. The presence of yttrium carbonate could function to degrade the adhesion of the Au to the $Y_2O_3$.

It was also shown that inclusion of a seed layer (for example tantalum (Ta)) can have an effect. A $Y_2O_3$ adhesion layer with a 5 Å tantalum (Ta) seed layer thereon (e.g., between the adhesion layer and the NFT material) increased, somewhat significantly, the ablation energy threshold when 50 nanosecond (ns) pulsed laser was applied on top of the Au surface. The laser ablation energy was about two times (2×) higher, implying a stronger interface adhesion with $Y_2O_3$ than $Al_2O_3$. The results can be seen in Table 1 below.

TABLE 1

| Structure | 50 nanosecond pulsed laser shining on Au top surface | |
|---|---|---|
| | Melt (mJ/cm$^2$) | Ablation (mJ/cm$^2$) |
| $Al_2O_3$ + 5 Å Zr + Au | 180 | 317 |
| $Al_2O_3$ + 5 Å Ta + Au | 160 | 400 |
| $Y_2O_3$ + 5 Å Ta + Au | 200 | 743 |

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of devices including at least one adhesion layer and methods of forming adhesion layers are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device comprising:
   a near field transducer (NFT), the NFT having at least one external surface; and
   at least one adhesion layer positioned on at least a portion of the at least one external surface, the adhesion layer comprising oxides of scandium, oxides of lanthanoids, oxides of actinoids, or combinations thereof, and the at least one adhesion layer having an average thickness from 1 nanometer (nm) to 10 nm.

2. The device according to claim 1, wherein the adhesion layer comprises scandium oxide ($Sc_2O_3$), lanthanum oxide ($La_2O_3$), cerium oxide ($Ce_2O_3$, or $CeO_2$), praseodymium oxide ($Pr_2O_3$), neodymium oxide ($Nd_2O_3$), promethium oxide ($Pm_2O_3$), samarium oxide ($Sm_2O_3$), europium oxide ($Eu_2O_3$), gadolinium oxide ($Gd_2O_3$), terbium oxide ($Tb_4O_7$, $Tb_2O_3$, $TbO_2$, or $Tb_6O_{11}$), dysprosium oxide ($Dy_2O_3$), holmium oxide ($Ho_2O_3$), erbium oxide ($Er_2O_3$), thulium oxide ($Tm_2O_3$), ytterbium oxide ($Yb_2O_3$), and lutetium oxide ($Lu_2O_3$), actinium oxide ($Ac_2O_3$), thorium oxide ($Th_2O_7$ or $ThO_2$), protactinium oxide ($Pa_2O_5$, $PaO_2$, or $PaO$), uranium oxide ($U_3O_8$, $UO_2$, $UO_3$, $U_2O_5$, or $UO_4.2H_2O$), neptunium oxide ($NpO_2$, $Np_2O_5$, or $Np_5O_8$), plutonium oxide ($PuO_2$ or $PuO_4$), americium oxide (AmO, $Am_2O_3$, or $AmO_2$), curium oxide ($Cm_2O_3$, $CmO_2$, or $CmO_4$), berkelium oxide ($Bk_2O_3$, or $BkO_2$), californium oxide ($Cf_2O_3$ or $CfO_2$), einsteinium oxide ($Es_2O_3$), fermium oxide ($Fm_2O_3$, or FmO), mendelevium oxide ($Md_2O_3$ or MdO), nobelium oxide ($No_2O_3$ or NoO), and lawrencium oxide ($Lr_2O_3$), or combinations thereof.

3. The device according to claim 1, wherein the adhesion layer comprises scandium oxide ($Sc_2O_3$).

4. The device according to claim 1, wherein the NFT comprises a disc and a peg, wherein the peg has five surfaces thereof that are not in contact with the disc and the disc has an upper surface and a side surface.

5. The device according to claim 4, wherein the adhesion layer is positioned on all five surfaces of the peg.

6. The device according to claim 4, wherein the adhesion layer is positioned on the side surface of the disc.

7. The device according to claim 1, wherein the NFT comprises Au and the adhesion layer comprises scandium oxide ($Sc_2O_3$).

8. The device according to claim 1, wherein the NFT comprises AuY.

9. The device according to claim 1, wherein the NFT comprises AuSc and the adhesion layer comprises $Sc_2O_3$.

10. The device according to claim 1, wherein the NFT comprises Ag.

11. A device comprising:
    a near field transducer (NFT), the NFT comprising a disc and a peg, wherein the peg has five surfaces thereof and the disc has an upper surface and a side surface; and
    at least one adhesion layer positioned on at least one surface of the peg or the disc, the adhesion layer comprising oxides of scandium, oxides of lanthanoids, oxides of actinoids, or combinations thereof, the at least one adhesion layer having an average thickness from 1 nanometer (nm) to 10 nm.

12. The device according to claim 11, wherein the adhesion layer comprises scandium oxide ($Sc_2O_3$), lanthanum oxide ($La_2O_3$), cerium oxide ($Ce_2O_3$, or $CeO_2$), praseodymium oxide ($Pr_2O_3$), neodymium oxide ($Nd_2O_3$), promethium oxide ($Pm_2O_3$), samarium oxide ($Sm_2O_3$), europium oxide ($Eu_2O_3$), gadolinium oxide ($Gd_2O_3$), terbium oxide ($Tb_4O_7$, $Tb_2O_3$, $TbO_2$, or $Tb_6O_{11}$), dysprosium oxide ($Dy_2O_3$), holmium oxide ($Ho_2O_3$), erbium oxide ($Er_2O_3$), thulium oxide ($Tm_2O_3$), ytterbium oxide ($Yb_2O_3$), and lutetium oxide ($Lu_2O_3$), actinium oxide ($Ac_2O_3$), thorium oxide ($Th_2O_7$ or $ThO_2$), protactinium oxide ($Pa_2O_5$, $PaO_2$, or PaO), uranium oxide ($U_3O_8$, $UO_2$, $UO_3$, $U_2O_5$, or $UO_4.2H_2O$), neptunium oxide ($NpO_2$, $Np_2O_5$, or $Np_5O_8$), plutonium oxide ($PuO_2$ or $PuO_4$), americium oxide (AmO, $Am_2O_3$, or $AmO_2$), curium oxide ($Cm_2O_3$, $CmO_2$, or $CmO_4$), berkelium oxide ($Bk_2O_3$, or $BkO_2$), californium oxide ($Cf_2O_3$ or $CfO_2$), einsteinium oxide ($Es_2O_3$), fermium oxide ($Fm_2O_3$, or FmO), mendelevium oxide ($Md_2O_3$ or MdO), nobelium oxide ($No_2O_3$ or NoO), and lawrencium oxide ($Lr_2O_3$), or combinations thereof.

13. The device according to claim 11, wherein the adhesion layer comprises scandium oxide ($Sc_2O_3$).

14. The device according to claim 11, wherein the NFT comprises Au and the adhesion layer comprises scandium oxide ($Sc_2O_3$).

15. The device according to claim 11, wherein the NFT comprises Ag.

16. A device comprising:
an energy source;
a near field transducer (NFT) configured to receive energy from the energy source, the NFT having at least one external surface; and
at least one adhesion layer positioned on at least a portion of the at least one external surface, the adhesion layer comprising oxides of scandium, oxides of lanthanoids, oxides of actionoids, or combinations thereof, the at least one adhesion layer having an average thickness from 1 nanometer (nm) to 10 nm.

17. The device according to claim 16, wherein the energy source comprises a laser.

18. The device according to claim 17 further comprising a waveguide, the waveguide configured to receive the energy from the energy source and couple it into the NFT.

19. The device according to claim 18, wherein the adhesion layer comprises scandium oxide ($Sc_2O_3$).

* * * * *